United States Patent
Park et al.

(10) Patent No.: US 8,103,254 B2
(45) Date of Patent: *Jan. 24, 2012

(54) METHOD AND SYSTEM FOR PROVIDING MULTIMEDIA RING BACK TONE SERVICE BY USING RECEIVER-SIDE SWITCHING CENTER

(75) Inventors: Seongsoo Park, Seoul (KR); Sangshin Lee, Seoul (KR); Daesic Woo, Seoul (KR); Donghahk Lee, Seongnam-si (KR); Wonsuk Chung, Seoul (KR); Joosik Lee, Seoul (KR); Myungsung Lee, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 1261 days.

This patent is subject to a terminal disclaimer.

(21) Appl. No.: 11/630,198

(22) PCT Filed: Jun. 28, 2005

(86) PCT No.: PCT/KR2005/002023
§ 371 (c)(1),
(2), (4) Date: Dec. 21, 2006

(87) PCT Pub. No.: WO2006/001682
PCT Pub. Date: Jan. 5, 2006

(65) Prior Publication Data
US 2008/0026731 A1    Jan. 31, 2008

(30) Foreign Application Priority Data
Jun. 28, 2004 (KR) .................. 10-2004-0049091

(51) Int. Cl.
*H04M 3/42* (2006.01)
*H04L 29/08* (2006.01)
(52) U.S. Cl. .............. 455/414.1; 455/414.4; 379/210.01

(58) Field of Classification Search ............... 455/414.1, 455/433, 466; 379/207.08, 207.16, 211.03, 379/21.04, 374.03, 372
See application file for complete search history.

(56) References Cited

U.S. PATENT DOCUMENTS
6,654,602 B1 * 11/2003 Fye et al. .................. 455/414.1
(Continued)

FOREIGN PATENT DOCUMENTS
KR    2000-00244 A1    1/2000
(Continued)

*Primary Examiner* — Lester Kincaid
*Assistant Examiner* — Kuo Woo
(74) *Attorney, Agent, or Firm* — Lowe Hauptman Ham & Berner, LLP

(57) ABSTRACT

Disclosed is a method for providing a multimedia Ring Back Tone (RBT) service by using a receiver-side switching center, which comprising the steps of: (a) receiving an ISDN User Part (ISUP) call connection request message including information (multimedia codec information) regarding a multimedia codec from a caller-side switching center when the originating terminal attempts a call connection to a terminating terminal; (b) transmitting the ISUP call connection request message including the multimedia codec information to a sound source-providing server; (c) requesting the caller-side switching center to set the multimedia codec, thereby activating a routing path for the RBT service; and (d) receiving a RBT sound source selected using the multimedia codec information from the sound source-providing server and transmitting the RBT sound source to the caller-side switching center.

25 Claims, 6 Drawing Sheets

U.S. PATENT DOCUMENTS

| | | | |
|---|---|---|---|
| 7,184,532 B2 * | 2/2007 | Creamer et al. | 379/207.08 |
| 7,242,757 B2 * | 7/2007 | Hahm et al. | 379/207.16 |
| 7,336,777 B2 * | 2/2008 | Lee et al. | 379/207.08 |
| 2004/0120494 A1 * | 6/2004 | Jiang et al. | 379/210.01 |
| 2005/0101301 A1 * | 5/2005 | Kim et al. | 455/412.1 |
| 2008/0025491 A1 * | 1/2008 | Park et al. | 379/207.16 |
| 2008/0043642 A1 * | 2/2008 | Park et al. | 370/259 |

FOREIGN PATENT DOCUMENTS

| | | |
|---|---|---|
| KR | 2005-19344 A1 | 3/2005 |
| KR | 2005-40605 A1 | 5/2005 |
| WO | WO 2004032547 A1 * | 4/2004 |
| WO | 2004-093422 A1 | 10/2004 |

* cited by examiner

METHOD AND SYSTEM FOR PROVIDING MULTIMEDIA RING BACK TONE SERVICE BY USING RECEIVER-SIDE SWITCHING CENTER

CROSS REFERENCE TO RELATED APPLICATION

This application is the National Phase application of International Application No. PCT/KR2005/002023, filed Jun. 28, 2005, which designates the United States and was published in English. This application, in its entirety, is incorporated herein by reference.

FIELD OF THE INVENTION

The present invention relates to a method and a system for providing a multimedia Ring Back Tone (Hereinafter, referred to as RBT) service by using a receiver-side switching center. More particularly, the present invention relates to a method and a system for providing a multimedia RBT service by using a receiver-side switching center, which can provide a high quality RBT service by operating a multimedia codec allowing high quality music playback during an RBT interval and operating a voice codec such as an Enhanced Variable Rate Codec (Hereinafter, referred to as EVRC) during voice communication when an originating terminal supports the multimedia codec capable of improving the music quality in addition to a dedicated voice codec such as the EVRC.

BACKGROUND ART

With the rapid development of computer, electronic and communication technology, various wireless communication services using a wireless network have been provided. The most basic wireless communication service is a wireless voice communication service for providing voice communication to mobile communication terminal users in wireless manner, which has a characteristic of providing the service to the users regardless of time and place. Further, the wireless communication service supplements a voice communication service with a text message service. Recently, a wireless Internet service has emerged, which provides an Internet communication service to mobile communication terminal users through a wireless network.

Accordingly, subscribers of a mobile communication service can not only communicate with partners by using a wireless communication service regardless of time and place while freely moving here and there, but also receive various information, such as news, weather, sports, stocks, exchange rates and traffic information, in the form of texts, voice, images, etc.

With the development of mobile communication technology as described above, services provided by a Code Division Multiple Access (Hereinafter, referred to as CDMA) mobile communication system have been developed from voice services to multimedia communication services for transmitting data such as circuit and packet data.

Recently, with the development of information communication, an International Mobile Telecommunication (Hereinafter, referred to as IMT)-2000, e.g., a CDMA 2000 1×, 3×, EV-DO or a Wideband CDMA (WCDMA), has been commercialized, which is the $3^{rd}$ mobile communication system and has been established as a standard by an International Telecommunication Union Recommendation (ITU-R). Further, a wireless Internet service has been provided at a transmission speed of 307.2 Kbps at maximum far faster than 14.4 Kbps or 56 Kbps, which is a data transmission speed supported by an Interim Standard (Hereinafter, referred to as IS)-95A network or an IS-95B network, by means of an IS-95C network evolved from the existing IS-95A network and IS-95B network. In particular, an IMT-2000 service is used, so that the quality of an existing voice and Wireless Application Protocol (WAP) service can be improved and various multimedia services, e.g., Audio On Demand (AOD), Video On Demand (VOD), etc., can be provided at higher speed.

Recently, an RBT service or a so-called coloring RBT service has been highlighted, in which various sounds customized by the user of a call-receiving mobile communication terminal are outputted to a mobile communication terminal or a general telephone of a calling party as RBTs. This RBT service includes a concept for RBTs designated by a called party to be provided to a calling party. That is, the RBT service is a service in which the newest Korean songs, pop songs, a recorded voice, bird or water sounds, etc., can be used as RBTs instead of existing mechanical RBTs, e.g., "ring, ring" sound, occurring during ordinary communication.

The RBT service as described above has been provided, so that a partner can listen to sounds of a sound source customized by a called party instead of uniform and mechanical RBTs. Therefore, the partner can obtain auditory satisfaction.

Most mobile communication terminals use a voice codec having a variable rate such as an EVRC for the efficiency of voice communication and the optimization of radio channels. The EVRC is a codec for variably coding voice information according to the amount of voice information. That is, the EVRC encodes voice at a low rate during no-sound interval in which speakers do not output sound and encodes voice at high speed when the amount of information is large. It may be understood that this EVRC is an efficient codec as compared with existing codecs for always encoding voice at constant speed. The EVRC is used, so that the system capacity of a CDMA mobile communication system can increase and power consumption can also be minimized.

However, a voice codec having a variable rate such as this EVRC may deteriorate the sound quality for music, such as background sounds having nearly no-sound interval, due to a variable rate coding error. In order to overcome this problem, music service providers have made efforts to minimize the loss of sound sources due to a voice codec by extracting the sound sources and correcting the sound sources according to the EVRC. This sound source correction has depended on pre-processing considering the characteristics of the EVRC or manual operation of a sound specialist.

However, these processes may improve the quality of the music service through the EVRC nearly up to the level of the voice quality, but they have difficulty in improving the quality of the music service beyond such a level. Therefore, most high quality music services currently being provided separately use high quality multimedia codecs and provide music through data channels instead of voice channels. Herein, most of these commercialized multimedia service codecs have required transmission speeds over 16 K. In order to satisfy this transmission speed, a download service or a realtime multimedia service has been provided through data communication channels.

Accordingly, when a music service using this multimedia codec is applied to an RBT service, the quality of sound may be improved. However, a problem with the data rate required for multimedia voice transmission and the unavoidable use of voice channels instead of data channels still exists. Herein, it is theoretically possible that the data rate problem can be solved by lowering the data rate under 8 K through revision of encoding and decoding algorithms of the multimedia codec. However, in order to apply a multimedia codec for which the average rate has changed less than 8 K to voice channels through which an RBT service is currently provided, a partial modification of a mobile communication system is unavoidable.

SUMMARY OF THE INVENTION

Therefore, the present invention has been made in view of the above-mentioned problems, and it is an object of the present invention to provide a high quality RBT service even without change in an existing mobile communication system by operating a multimedia codec allowing high quality music playback during a RBT interval and operating a voice codec such as an EVRC during voice communication when an originating terminal supports the multimedia codec capable of improving the music quality in addition to a dedicated voice codec such as the EVRC.

According to one aspect of the present invention, there is provided a method for providing a multimedia Ring Back Tone (RBT) service by using a receiver-side switching center, which allows RBT sound sources previously set in a sound source-providing server by a called subscriber to be reproduced to an originating terminal by means of a Home Location Register (HLR) and the sound source-providing server for storing the RBT sound sources when a calling subscriber telephones the called subscriber, the HLR storing profile information including whether the subscriber has joined the RBT service, the method comprising the steps of: (a) receiving an ISDN User Part (ISUP) call connection request message including information (multimedia codec information) regarding a multimedia codec from a caller-side switching center when the originating terminal attempts a call connection to a terminating terminal; (b) transmitting the ISUP call connection request message including the multimedia codec information to the sound source-providing server; (c) requesting the caller-side switching center to set the multimedia codec, thereby activating a routing path for the RBT service; and (d) receiving a RBT sound source selected using the multimedia codec information from the sound source-providing server and transmitting the RBT sound source to the caller-side switching center.

According to another aspect of the present invention, there is provided a system for providing a multimedia Ring Back Tone (RBT) service by using a receiver-side switching center, which allows RBT sound sources previously set in a sound source-providing server by a called subscriber to be reproduced to an originating terminal by means of a Home Location Register (HLR) and the sound source-providing server for storing the RBT sound sources when a calling subscriber telephones the called subscriber, the HLR storing profile information including whether the subscriber has joined the RBT service, the system comprising: the receiver-side switching center for receiving an ISDN User Part (ISUP) call connection request message including information (multimedia codec information) regarding a multimedia codec from a caller-side switching center when the originating terminal attempts a call connection to a terminating terminal, transmitting the ISUP call connection request message to the sound source-providing server, requesting the caller-side switching center to set the multimedia codec so as to activate a routing path for the RBT service, receiving a RBT sound source convertible by the multimedia codec from the sound source-providing server, and transmitting the RBT sound source to the caller-side switching center.

According to further another aspect of the present invention, there is provided a system for providing a multimedia Ring Back Tone (RBT) service by using a receiver-side switching center, which allows RBT sound sources previously set in a sound source-providing server by a called subscriber to be reproduced to an originating terminal when a calling subscriber telephones the called subscriber, the system comprising: a Home Location Register (HLR) for storing profile information including whether the subscriber has joined the RBT service and information (multimedia codec information) regarding a multimedia codec supported by a subscriber terminal; the receiver-side switching center for receiving an ISDN User Part (ISUP) call connection request message including the multimedia codec information from a caller-side switching center when the originating terminal attempts a call connection to the terminating terminal, transmitting the ISUP call connection request message to a sound source-providing server, requesting the caller-side switching center to set the multimedia codec in order to activate a routing path for the RBT service, receiving RBT sound sources convertible by the multimedia codec from the sound source-providing server, and transmitting the RBT sound sources to the caller-side switching center; and the sound source-providing server for storing the RBT sound sources and transmitting the RBT sound sources selected using the multimedia codec information to the receiver-side switching center when the ISUP call connection request message is received from the receiver-side switching center.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENTS

Figure 1:
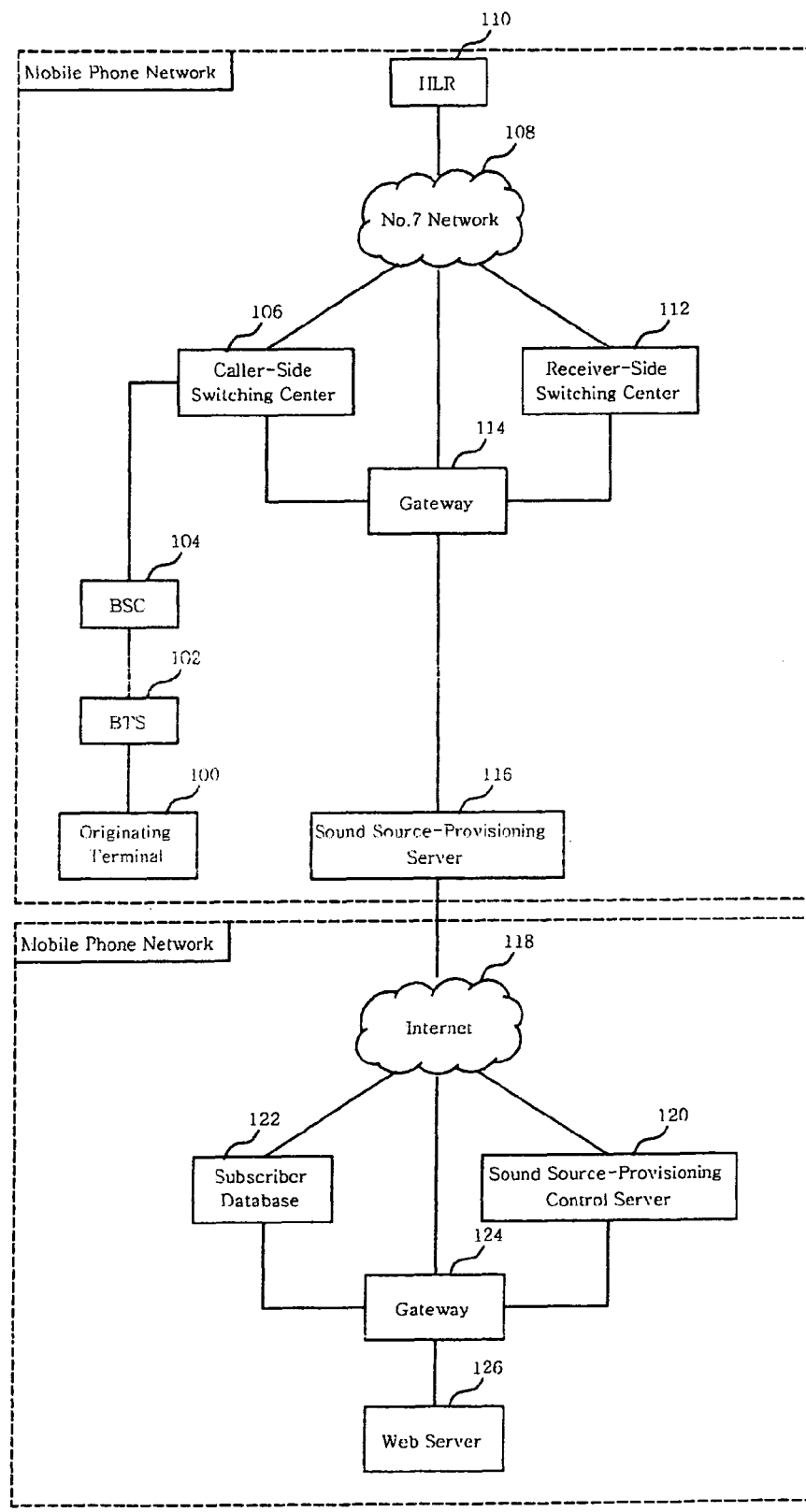
FIG. 1 is a block diagram schematically illustrating the construction of a system for providing a multimedia RBT service by using a receiver-side switching center according to a preferred embodiment of the present invention.

Reference will now be made in detail to the preferred embodiment of the present invention. The same reference numerals are used to designate the same elements as those shown in other drawings. In the following description of the present invention, a detailed description of known configurations and functions incorporated herein will be omitted when it may make the subject matter of the present invention rather unclear.

FIG. 1 is a block diagram schematically illustrating the construction of a system for providing a multimedia RBT service by using a receiver-side switching center according to a preferred embodiment of the present invention.

As illustrated in FIG. 1, the system for providing the multimedia RBT service by using the receiver-side switching center according to the preferred embodiment of the present invention may include an originating terminal 100, a Base Transceiver Station (Hereinafter, referred to as BTS) 102, a Base Station Controller (Hereinafter, referred to as BSC) 104, a caller-side switching center 106, a No.7 network 108, a Home Location Register (Hereinafter, referred to as HLR) 110, the receiver-side switching center 112, gateways 114 and 124, a sound source-providing server 116, the Internet 118, a sound source-providing control server 120, a subscriber database 122, a web server 126, etc.

Hereinafter, each element will be briefly described. The HLR 110 includes subscriber information and communicates with the caller-side switching center 106 and the receiver-side switching center 112 via the No.7 network 108 based on a Signaling Transfer Protocol (STP). The caller-side switching center 106 and the receiver-side switching center 112 are connected to the sound source-providing server 116 for storing sound sources through the gateway 114. Further, the caller-side switching center 106 and the receiver-side switching center 112 are connected to the BSC 104 in order to support access for mobile communication. The BSC 104 communicates with a user terminal and takes charge of source allocation and vocoder control for voice communication channels. The sound source-providing server 116 is connected to the subscriber database 122 and the sound source-providing control server 120 through the Internet 118.

Hereinafter, main elements according to the preferred embodiment of the present invention will be described in more detail.

The originating terminal 100 according to the preferred embodiment of the present invention is a terminal capable of performing voice communication and image communication for a partner through a mobile communication network and performing data communication through wireless Internet connection. Further, the originating terminal 100 according to the preferred embodiment of the present invention supports an H.245 for a call control, an H.245 for a call setup and a call signaling, an audio codec and a video codec. That is, the originating terminal 100 is a terminal capable of receiving a music service, etc., through voice communication channels by using a multimedia codec other than an EVRC for voice communication. Accordingly, when RBT sound sources are received, the originating terminal 100 according to the preferred embodiment of the present invention reproduces the received sound sources by means of a multimedia codec according to the sound sources.

For example, the multimedia codec may include an Advanced Audio Coding (Hereinafter, referred to as AAA) codec, etc. The AAA employs a voice compression scheme, has been used for a music distribution service using the Internet, etc., and has also been generally used for MP3, Adaptive Transform Acoustic Coding (ATRAC 3), etc. The AAA has a compression rate higher than MP3, but the quality of sound is relatively bad. Accordingly, the AAA is proper for music distribution using personal communication system (telephone), etc.

The BTS 102 according to the preferred embodiment of the present invention is a network endpoint equipment for directly inter-working with a terminal by performing a baseband signal processing, a wire/wireless conversion, transmission/reception of radio signals, etc. The BTS 102 receives a call trial to a terminating terminal from the originating terminal 100 through a traffic channel of signals channels, and transmits the received call trial to the caller-side BSC 104.

The BSC 104 according to the preferred embodiment of the present invention controls the BTS 102, and performs radio channel allocation and release for a terminal, transmit power control of a terminal and the BTS 102, determination of inter-cell soft handoff and hard handoff, a transcoding, a vocoding, a Global Positioning System (GPS) clock distribution, operation and maintenance for the BTS 102, etc.

Each of the switching centers 106 and 112 according to the preferred embodiment of the present invention performs a control function for an efficient operation of a mobile communication network and a switching function for a communication request of the originating terminal 100. That is, each of the switching centers 106 and 112 performs a processing function for basic and supplementary services of a terminal, a processing function for incoming and originating calls of a subscriber, a location registration procedure, a handoff procedure processing function, an inter-working function with another network, etc. Each of the switching centers 106 and 112 of an IS-95 A/B/C system includes an Access Switching Subsystem (ASS) for performing a distributed call processing function, an Interconnection Network Subsystem (INS) for performing a centralized call processing function, a Central Control Subsystem (CCS) for taking charge of a centralization function of operation and preservation, a Location Registration Subsystem (LRS) for performing storage and maintenance function of information for mobile subscribers, etc. Further, each of the switching centers 106 and 112 for the $3^{rd}$ and the $4^{th}$ generation may include an Asynchronous Transfer Mode (Hereinafter, referred to as ATM) switch. The ATM switch transmits packets by the cell, thereby improving the transmission speed and the efficiency of a circuit use.

When the originating terminal 100 attempts a call connection to a terminating terminal, the caller-side switching center 106 according to the preferred embodiment of the present invention receives location information of the terminating terminal and information (multimedia codec information) regarding the multimedia codec supported by the originating terminal 100 from the HLR 110. Further, the caller-side switching center 106 transmits an ISDN User Part (ISUP) call connection request message including the received multimedia codec information to the receiver-side LO switching center 112.

When a multimedia codec setup request is received from the receiver-side switching center 112, the caller-side switching center 106 requests the BTS 102 and the originating terminal 100 to set a multimedia codec and activates a routing path for the RBT service.

For this, each of the switching centers 106 and 112 according to the preferred embodiment of the present invention communicates with the HLR 110 when location registration of a subscriber is performed, and stores the information regarding whether the subscriber has joined the RBT service and information for routing to the sound source-providing server 116.

The HLR 110 according to the preferred embodiment of the present invention performs functions of recognizing or deleting the registration of a terminal, checking the location of the terminal, etc. Further, the HLR 110 stores profile information including whether a subscriber has joined an RBT service, information for routing to the sound source-providing server 116, and multimedia codec information supported by a subscriber terminal. The multimedia codec information supported by the subscriber terminal is stored as supplementary service subscription information of an originating subscriber profile.

When the originating terminal 100 attempts a call connection to the terminating terminal, the receiver-side switching center 112 according to the preferred embodiment of the present invention receives the ISUP call connection request message including the multimedia codec information from the caller-side switching center 106, and transmits the ISUP call connection request message to the sound source-providing server 116. Further, the receiver-side switching center 112 receives RBT sound sources convertible by the multimedia codec from the sound source-providing server 116, and transmits the received RBT sound sources to the originating terminal 100 via the caller-side switching center 106, the BSC 104 and the BTS 102.

After transmitting the ISUP call connection request message to the sound source-providing server 116, the receiver-side switching center 112 requests the caller-side switching center 106 to set the multimedia codec and activates a routing path for the RBT service.

When a call is terminated in the terminating terminal, the receiver-side switching center 112 transmits call termination signals and codec setup change request signals for voice communication of the terminating terminal to the caller-side switching center 106, and releases an ISUP call connection with the sound source-providing server 116. Further, when the codec setup change request signals are received from the receiver-side switching center 112, the caller-side switching center 106 requests the BTS 102 and the originating terminal 100 to change a codec setup and allows voice communication to be performed.

When the multimedia codec supported by the originating terminal 100 is a codec other than an EVRC, a control message for controlling the RBT sound sources to pass through a caller-side vocoder is transmitted to the caller-side switching center 106 from the receiver-side switching center 112.

The sound source-providing server 116 according to the preferred embodiment of the present invention stores the RBT sound sources. Accordingly, when the ISUP call connection request message is received from the receiver-side switching center 112, the sound source-providing server 116 transmits a RBT sound source selected using the multimedia codec information included in the ISUP call connection request message to the receiver-side switching center 112. The sound source-providing server 116 stores various sound sources encoded according to the codec types applicable to the user terminal, connects to the switching centers 106 and 112 through the gateway 114, and provides a sound source proper for the codec type required by the switching centers 106 and 112.

Further, the sound source-providing server 116 according to the preferred embodiment of the present invention generates sound source code request signals including the multimedia codec information received from the receiver-side switching center 112, and transmits the generated sound source code request signals to the sound source-providing control server 120. Further, the sound source-providing server 116 provides the receiver-side switching center 112 with RBT sound sources searched using RBT sound source codes received from the sound source-providing control server 120. The sound source code request signals include the multimedia codec information, identification information of the terminating terminal, identification information of the originating terminal 100, call request time zone information, etc.

The sound source-providing control server 120 according to the preferred embodiment of the present invention communicates with the sound source-providing-server 116 through the Internet 118. When the sound source code request signals including the multimedia codec information are received from the sound source-providing server 116, the sound source-providing control server 120 searches for the RBT sound source codes convertible by the multimedia codec and transmits the searched RBT sound source codes to the sound source-providing server 116. The RBT sound source codes are separately stored in the sound source-providing control server 120 according to each multimedia codec, each specific caller, each caller group, each originating time.

The web server 126 according to the preferred embodiment of the present invention is connected to the sound source-providing server 116 or the sound source-providing control server 120 through the Internet 118, adds sound sources to be stored in the sound source-providing server 116, or provides the sound source-providing control server 120 with information for specifying sound sources and a wire/wireless web page for changing RBT sound source codes corresponding to this information. The information for specifying the sound sources may include specific caller information, caller group information, or an originating time zone, etc.

Figure 2:
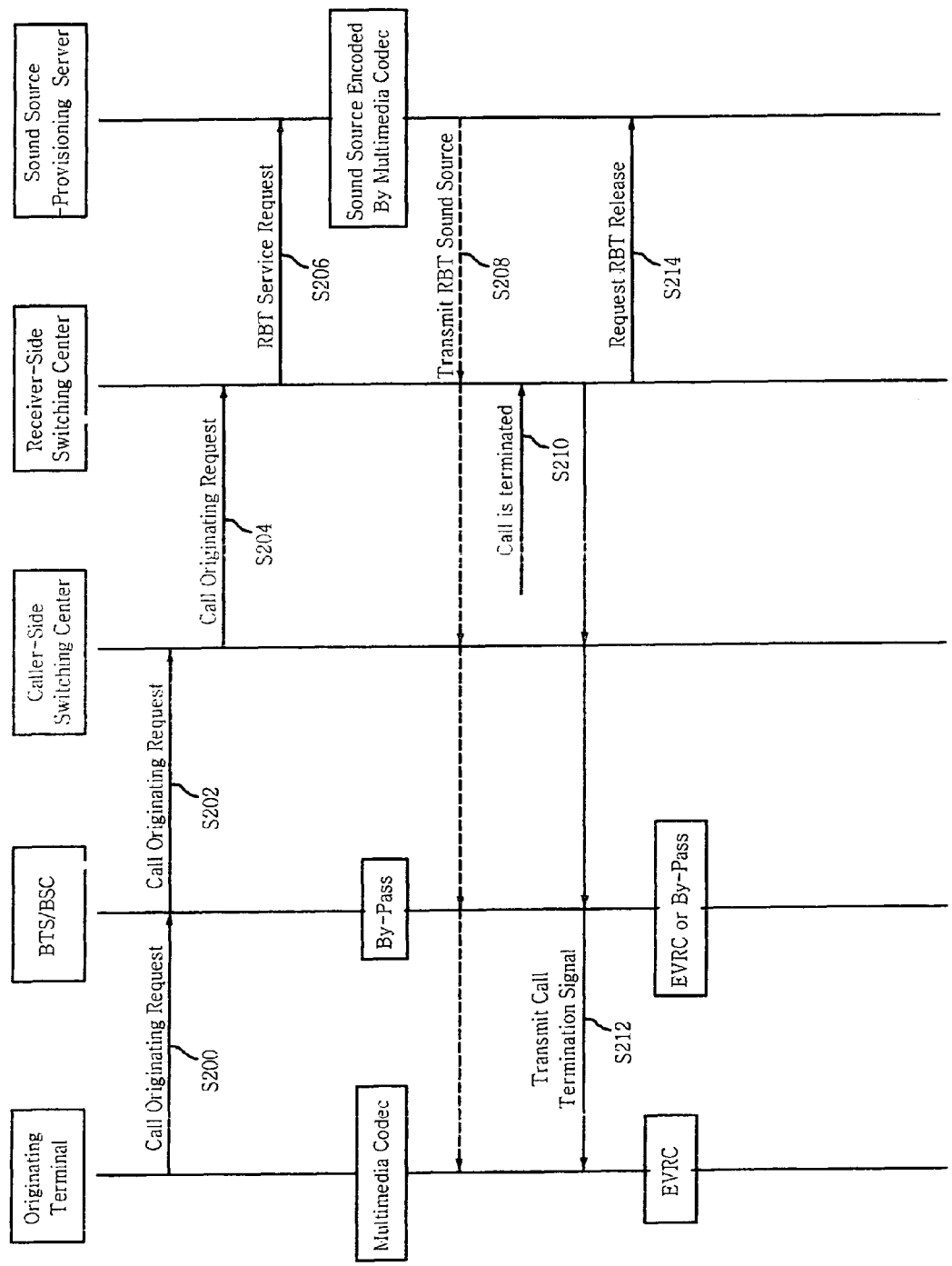
FIG. 2 is a flow diagram schematically illustrating a process for providing a multimedia RBT service by using a receiver-side switching center according to a preferred embodiment of the present invention.

FIG. 2 is a flow diagram schematically illustrating a process for providing the multimedia RBT service by using the receiver-side switching center 112 according to the preferred embodiment of the present invention.

When the originating terminal 100 including a multimedia codec transmits a call originating request to the BTS 102 and the BSC 104 (S200), the BTS 102 and the BSC 104 transfer the call originating request to the caller-side switching center 106 (S202).

The caller-side switching center 106 transmits a call connection request to the receiver-side switching center 112 (S204), and the receiver-side switching center 112 transmits a RBT service request to the sound source-providing server 116 (S206). As described above, the sound source-providing server 116 stores the RBT sound sources encoded according to the multimedia codec used in the originating terminal 100, and transmits the RBT sound sources to the originating terminal 100 through the receiver-side switching center 112 and the caller-side switching center 106 (S208). Herein, a vocoder located in the caller-side BSC 104 cannot support the multimedia codec and bypasses the RBT sound sources transferred from the sound source-providing server 116 because the RBT sound sources are previously encoded sound sources.

The originating terminal 100 reproduces the received RBT sound sources by using the multimedia codec. Then, when a call is terminated in the terminating terminal (S210), the receiver-side switching center 112 transmits the call termination signals to the caller side (S212). The receiver-side switching center 112 requests the sound source-providing server 116 to release a RBT (S214), and controls a vocoder of the BSC 104 and a voice codec of the originating terminal 100 in order to perform voice communication.

Figure 3A:
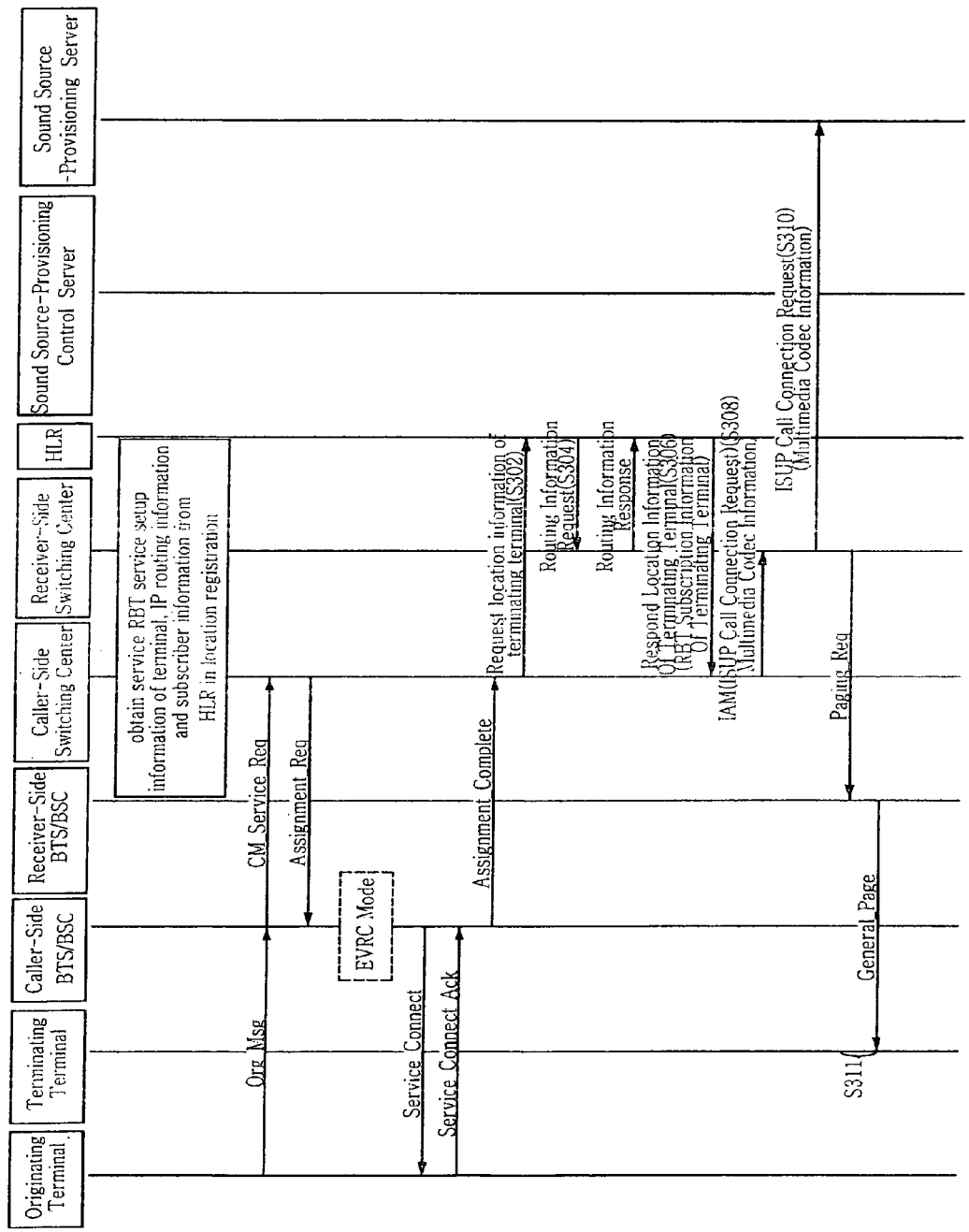
FIGS. 3a and 3b are flow diagrams illustrating in detail a process for providing a multimedia RBT service by using a receiver-side switching center according to a preferred embodiment of the present invention.
Figure 3B:
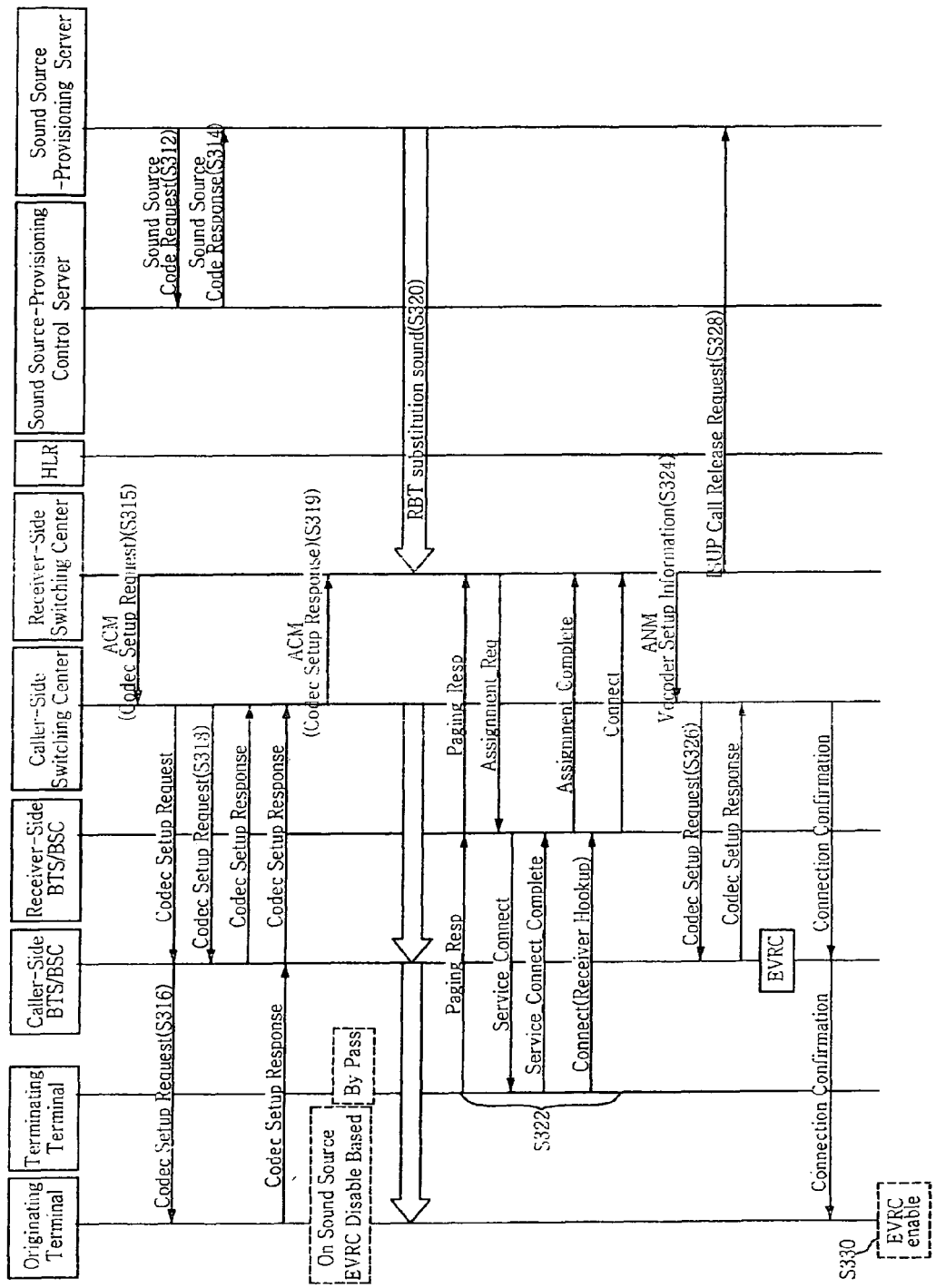

FIGS. 3a and 3b are flow diagrams illustrating in detail the process for providing the multimedia RBT service by using the receiver-side switching center 112 according to the preferred embodiment of the present invention.

When the originating terminal 100 attempts a call connection to a terminating terminal, the caller-side switching center 106 performs radio resource allocation, channel allocation and vocoder allocation for the BSC 104 (S300). When the caller-side radio call setup is completed, the caller-side switching center 106 requests the HLR 110 to transmit location information of the terminating terminal (S302). The HLR 110 requests the receiver-side switching center 112, in which the terminating terminal is located, to transmit routing information, and the receiver-side switching center 112 transmits a response message to the HLR 110 (S304). Further, the HLR 110 transmits the location information of the terminating terminal to the caller-side switching center 106 (S306). Herein, the caller-side switching center 106 also receives information regarding the multimedia codec supported by the originating terminal 100 together with the location information of the terminating terminal. The caller-side switching center 106 transmits the ISUP call connection request message to the receiver-side switching center 112 in order to report that there is a call out request for the terminating terminal by means of an IAM message (S308). The ISUP call connection request message includes the information regarding the multimedia codec supported by the originating terminal 100.

The receiver-side switching center 112 determines whether the terminating terminal has joined the RBT service and transmits the ISUP call connection request message including multimedia codec information for the RBT of the originating terminal 100 to the sound source-providing server 116 by means of routing data (S310). Herein, when the originating terminal 100 can receive the RBT service by means of a codec other than an EVRC, the receiver-side switching center 112 transmits a control message for passing through the caller-side EVRC vocoder to the caller-side switching center 106. The receiver-side switching center 112 performs paging for the terminating terminal, thereby informing the terminating terminal of the reception of an incoming call (S311).

The sound source-providing server 116 requests the sound source-providing control server 120 to inform RBT service sound source codes set by a called subscriber (S312), and the sound source-providing control server 120 informs the sound source-providing server 116 of the sound source codes set by the called subscriber (S314). The multimedia codec information of the originating terminal 100 is used in this process, so that a RBT sound source available by the multimedia codec of the originating terminal 100 is selected and transferred to the sound source-providing server 116. For example, when the sound source-providing server 116 determines the selection of a sound source according to the multimedia codec of the originating terminal 100, it is possible to use a method for commonly using sound source codes received from the sound source-providing control server 120 and then adding other codecs of the originating terminal 100 in order to complete sound source codes. However, when the sound source-providing control server 120 takes charge of the selection of the sound source, the sound source-providing server 116 may additionally transmit the multimedia codec information of the originating terminal 100 in requesting the sound source, and may also generate codes by combining sound source setup information of a subscriber with codec information.

The receiver-side switching center 112 transmits a codec setup request to the caller-side switching center 106 by means of the multimedia codec for bypassing of the caller-side vocoder (S315). The caller-side switching center 106 having received the codec setup request requests the BSC 104 and the originating terminal 100 to perform the codec setup so that a RBT through the multimedia codec can be provided, receives a response for the codec setup request (S316 and 318), and then activates routing paths for the RBT.

The RBT sound source is transferred from the sound source-providing server 116 to the originating terminal 100 via the receiver-side switching center 112, the caller-side switching center 106, the BSC 104 and the BTS 102 until the call is terminated in the terminating terminal (S320).

When the call is terminated in the terminating terminal, the receiver-side switching center 112 transmits codec setup change request signals to the caller-side switching center 106 so that the codec can normally operate for voice communication of the terminating terminal, together with call termination signals for reporting the call termination (S322, S324 and S326). Further, the receiver-side switching center 112 ends the RBT service by releasing an ISUP call connection with the sound source-providing server 116 (S328). Further, when these codec setup change request signals are received from the receiver-side switching center 112, the caller-side switching center 106 requests the BSC 104 to change the codec setup. Therefore, normal communication can be performed (S330).

Figure 4:
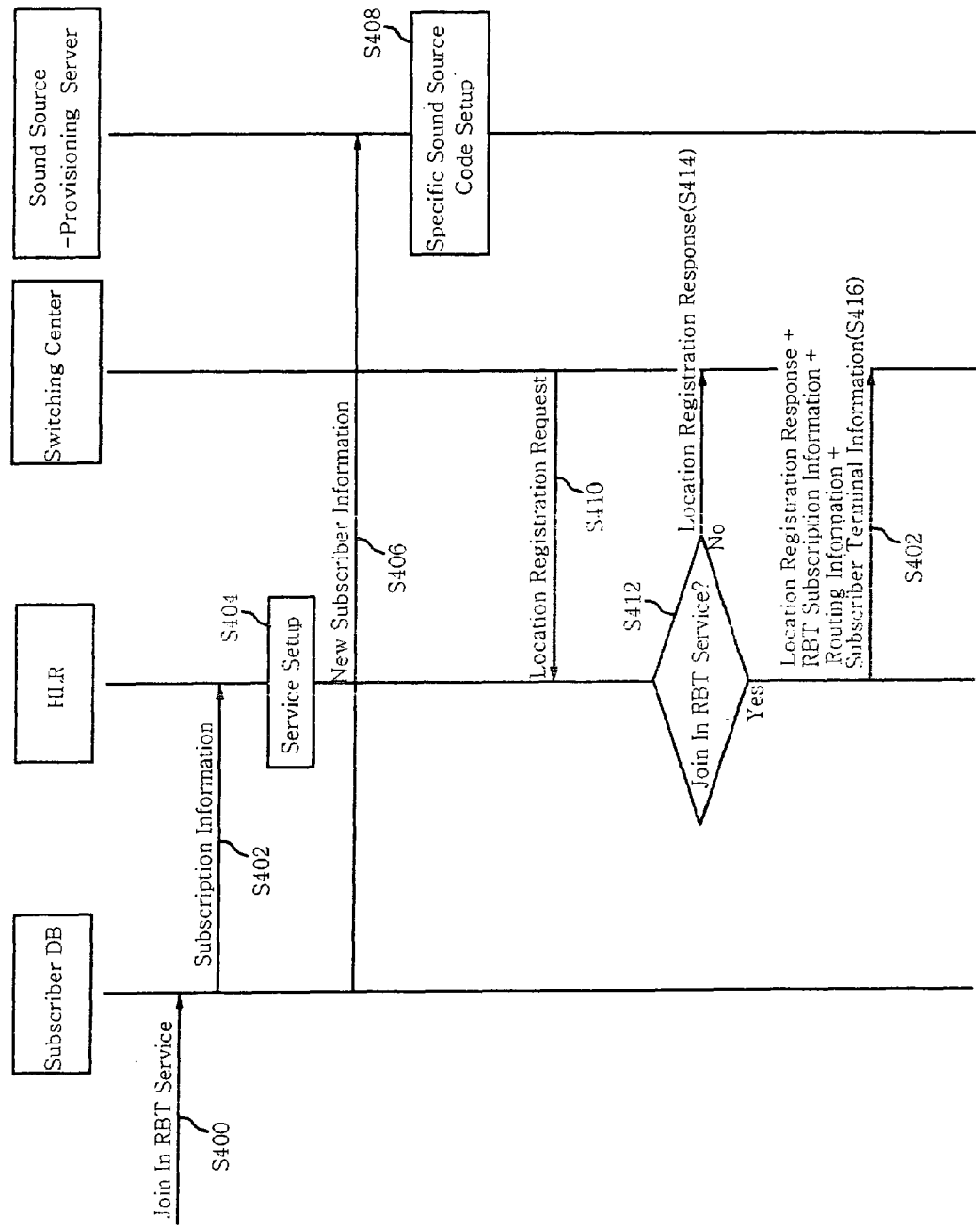
FIG. 4 is a flow diagram illustrating a subscription procedure for an RBT service according to a preferred embodiment of the present invention.

FIG. 4 is a flow diagram illustrating a subscription procedure for the RBT service according to a preferred embodiment of the present invention.

When a called subscriber applies for the use of the RBT service according to a preferred embodiment of the present invention to a service provider, the provider registers the service in the subscriber database 122 (S400). The subscriber database 122 performs service registration for the HLR 110 (S402).

The HLR 110 sets corresponding information in a database therein. When a corresponding terminal receives the RBT service, the HLR 110 generates identification information for identifying an available multimedia codec (S404). This identification information may also be extracted from subscriber terminal information previously registered in the HLR 110.

Further, new subscriber information stored in the subscriber database 122 is transferred to the sound source-providing server 116 (S406), and the sound source-providing server 116 and the sound source-providing control server 120 sets a specific sound source code for the new subscriber information (S408).

When a location registration request is received from a corresponding switching center currently providing a mobile service (S410), the HLR 110 determines whether the terminal has joined the RBT service (S412). When the terminal has joined the RBT service, the HLR 110 transfers RBT service setup information, routing information for a call setup to the sound source-providing server 116, subscriber terminal information, etc., to the switching center. The switching center having received the information from the HLR 110 sets the received RBT-related information in a corresponding subscriber database, the RBT-related information including the information regarding whether the terminal has joined the RBT service, the routing information, the mobile terminal information, etc.

Figure 5:
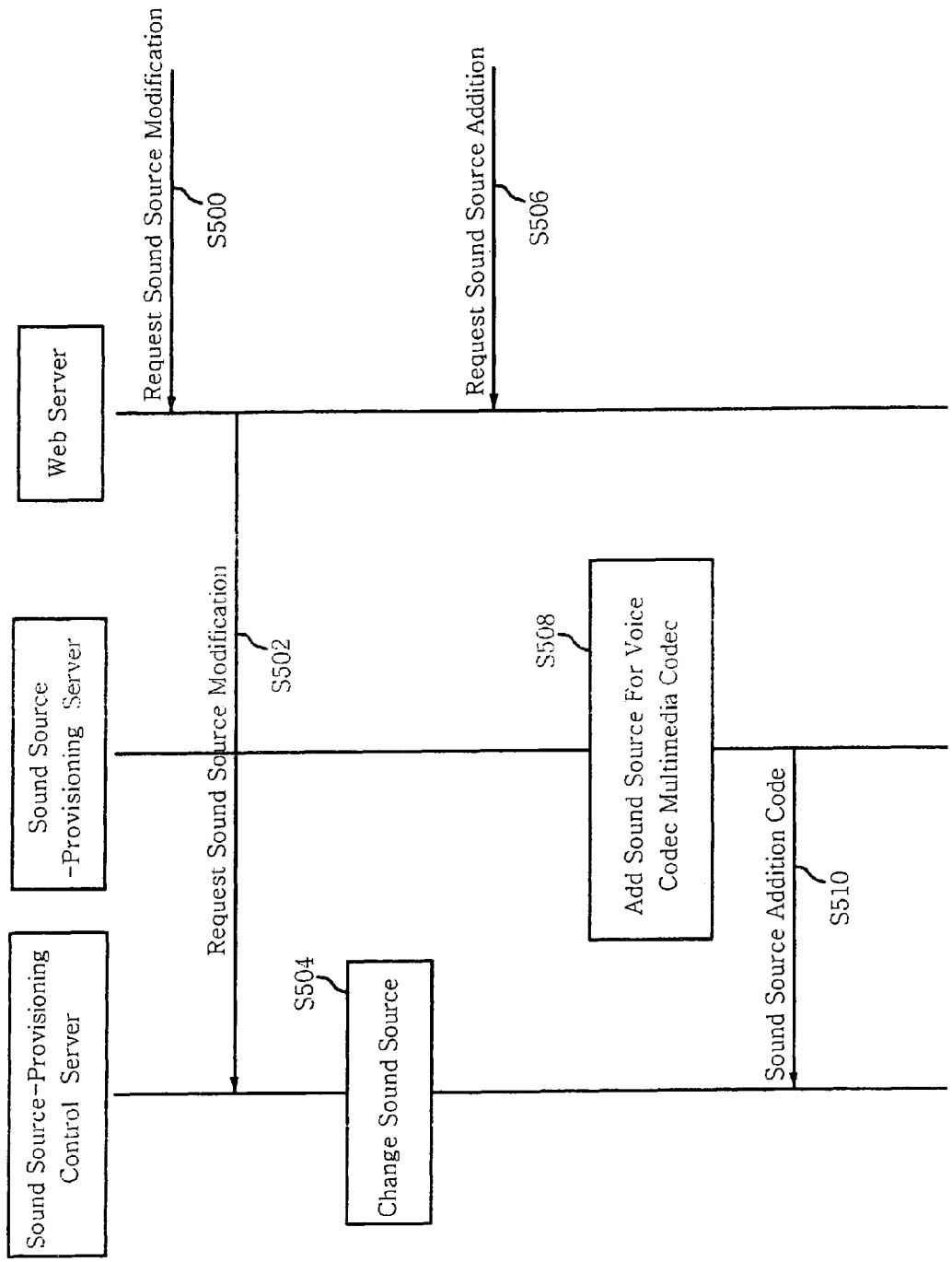
FIG. 5 is a flow diagram illustrating a procedure for modifying and adding RBT sound sources by means of a multimedia codec in an RBT service according to a preferred embodiment of the present invention.

FIG. 5 is a flow diagram illustrating a procedure for modifying and adding RBT sound sources by means of the multimedia codec in the RBT service according to a preferred embodiment of the present invention.

When a subscriber having joined the RBT service accesses the designated web server 126 by means of a PC, etc., the web server 126 provides a screen for service modification and addition. When the subscriber requests the RBT sound source modification by inputting the subscriber's phone number and selecting one of RBT sound sources previously stored in the sound source-providing server 116 (S500), the web server 126 requests the sound source-providing control server 120 to modify the RBT sound source (S502). The sound source-providing control server 120 releases existing sound source codes having been related to and set for the subscriber on the basis of the request, and stores codes of the selected sound source, thereby allowing the selected sound source to be used in the RBT service (S504).

After the subscriber selects a sound source addition through a web page, when the subscriber appends a specific file including a phone number, a guidance sound, music, etc., and requests the sound source addition through the web server 126 (S506), the web server 126 requests the sound source-providing server 116 to add sound sources. The sound source-providing server 116 ensures the appended file as an additional sound (S508) and relates additional sound source codes to the corresponding subscriber (S510). Herein, the file including the guidance sound, the music, etc., used in the sound source addition may be a file encoded through a multimedia codec by the subscriber or the original sound. If the file is the original sound, it is preferred to process the file through a separate encoding procedure before being stored in the sound source-providing server 116 in order to support various multimedia codecs.

As description above, the present invention proposes a scheme capable of operating a multimedia codec allowing high quality music playback during a RBT interval and operating a voice codec such as an EVRC during voice communication in an RBT service using various types of multimedia codecs, so that a high quality RBT service can be provided. Further, the present invention proposes a scheme capable of providing a high quality RBT service even without change of a vocoder in a network equipment of a mobile communication system for an originating terminal supporting a multimedia codec.

Further, according to the present invention, because the qaulity of an RBT service currently being provided can be improved, a mobile communication provider can create new profits of additional cost for the improved service and improve the satisfaction of customers for a mobile communication service.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. A method of providing a multimedia Ring Back Tone (RBT) service by using a receiver-side switching center, which allows RBT sound sources previously set in a sound source-providing server by a called subscriber to be reproduced to an originating terminal by means of a Home Location Register (HLR) and the sound source-providing server for storing the RBT sound sources when a calling subscriber telephones the called subscriber, the HLR storing profile information including whether the subscriber has joined the RBT service, the method comprising the steps of:
   (a) receiving an ISDN User Part (ISUP) call connection request message including multimedia codec information regarding a multimedia codec from a caller-side switching center when the originating terminal attempts a call connection to a terminating terminal;
   (b) transmitting the ISUP call connection request message including the multimedia codec information to the sound source-providing server;
   (c) requesting the caller-side switching center to set the multimedia codec, thereby activating a routing path for the RBT service; and
   (d) receiving a RBT sound source selected using the multimedia codec information from the sound source-providing server and transmitting the RBT sound source to the caller-side switching center, so that the received RBT sound source is reproduced on the originating terminal according to the multimedia codec that is a codec other than a voice codec for voice communication between the originating terminal and the terminating terminal.

2. The method as claimed in claim 1, further comprising a step of transmitting call termination signals and codec setup change request signals for voice communication of the terminating terminal to the caller-side switching center, and releasing an ISUP call connection with the sound source-providing server, when a call is terminated.

3. The method as claimed in claim 2, wherein the caller-side switching center requests a caller-side Base Transceiver Station (BTS) to change a codec setup when the codec setup change request signals are received from the receiver-side switching center.

4. The method as claimed in claim 1, wherein, when the originating terminal attempts the call connection to the terminating terminal, the HLR transmits location information of the terminating terminal and information regarding the multimedia codec supported by the originating terminal to the caller-side switching center.

5. The method as claimed in claim 1, wherein, in step (a), a control message for controlling the RBT sound source to pass through a caller-side vocoder is transmitted to the caller-side switching center when the multimedia codec is a codec other than an Enhanced Variable Rate Codec (EVRC).

6. The method as claimed in claim 1, wherein the sound source-providing server stores various sound sources encoded according to multimedia codec types.

7. The method as claimed in claim 1, wherein the sound source-providing server transmits sound source code request signals including the multimedia codec information, which are received from the receiver-side switching center, to a sound source-providing control server, and provides the receiver-side switching center with the RBT sound source searched using RBT sound source codes received from the sound source-providing control server.

8. The method as claimed in claim 7, wherein the sound source code request signals include the multimedia codec information, identification information of the terminating terminal, identification information of the originating terminal, and/or call request time zone information.

9. The method as claimed in claim 7, wherein the RBT sound source codes are separately stored in the sound source-providing control server according to each multimedia codec, each specific caller, each caller group, and/or each originating time.

10. The method as claimed in claim 1, wherein the HLR stores multimedia codec information regarding multimedia codecs supported by each terminal having joined the multimedia RBT service.

11. A system for providing a multimedia Ring Back Tone (RBT) service by using a receiver-side switching center, which allows RBT sound sources previously set in a sound source-providing server by a called subscriber to be reproduced to an originating terminal by means of a Home Location Register (HLR) and the sound source-providing server for storing the RBT sound sources when a calling subscriber telephones the called subscriber, the HLR storing profile information including whether the subscriber has joined the RBT service, the system comprising:
   the receiver-side switching center for receiving an ISDN User Part (ISUP) call connection request message including multimedia codec information regarding a multimedia codec from a caller-side switching center when the originating terminal attempts a call connection to a terminating terminal, transmitting the ISUP call connection request message to the sound source-providing server, requesting the caller-side switching center to set the multimedia codec so as to activate a routing path for the RBT service, receiving a RBT sound source convertible by the multimedia codec from the sound source-providing server, and transmitting the RBT sound source to the caller-side switching center, so that the transmitted RBT sound source is reproduced on the originating terminal according to the multimedia codec that is a codec other than a voice codec for voice communication between the originating terminal and the terminating terminal.

12. The system as claimed in claim 11, wherein the receiver-side switching center transmits call termination signals and codec setup change request signals for voice communication of the terminating terminal to the caller-side switching center, and releases an ISUP call connection with the sound source-providing server, when a call is terminated.

13. The system as claimed in claim 12, wherein the caller-side switching center requests a caller-side Base Transceiver Station (BTS) to change a codec setup when the codec setup change request signals are received from the receiver-side switching center.

14. The system as claimed in claim 11, wherein, when the originating terminal attempts the call connection to the terminating terminal, the HLR transmits location information of the terminating terminal and information regarding the multimedia codec supported by the originating terminal to the caller-side switching center.

15. The system as claimed in claim 11, wherein the RBT sound sources received from the sound source-providing server is selected using the multimedia codec information.

16. The system as claimed in claim 11, wherein a control message for controlling the RBT sound source to pass through a caller-side vocoder is transmitted to the caller-side switching center when the multimedia codec is a codec other than an Enhanced Variable Rate Codec (EVRC).

17. The system as claimed in claim 11, wherein the sound source-providing server stores various sound sources encoded according to multimedia codec types.

18. The system as claimed in claim 11, wherein the sound source-providing server transmits sound source code request signals including the multimedia codec information, which are received from the receiver-side switching center, to a sound source-providing control server, and provides the receiver-side switching center with the RBT sound source searched using RBT sound source codes received from the sound source-providing control server.

19. The system as claimed in claim 18, wherein the sound source code request signals include the multimedia codec information, identification information of the terminating terminal, identification information of the originating terminal, and/or call request time zone information.

20. The system as claimed in claim 18, wherein the RBT sound source codes are separately stored in the sound source-providing control server according to each multimedia codec, each specific caller, each caller group, and/or each originating time.

21. The system as claimed in claim 11, wherein the HLR stores multimedia codec information regarding multimedia codecs supported by each terminal having joined the multimedia RBT service.

22. A system for providing a multimedia Ring Back Tone (RBT) service by using a receiver-side switching center, which allows RBT sound sources previously set in a sound source-providing server by a called subscriber to be reproduced to an originating terminal when a calling subscriber telephones the called subscriber, the system comprising:
a Home Location Register (HLR) for storing profile information including whether the subscriber has joined the RBT service and multimedia codec information regarding a multimedia codec supported by a subscriber terminal;
the receiver-side switching center for receiving an ISDN User Part (ISUP) call connection request message including the multimedia codec information from a caller-side switching center when the originating terminal attempts a call connection to the terminating terminal, transmitting the ISUP call connection request message to a sound source-providing server, requesting the caller-side switching center to set the multimedia codec in order to activate a routing path for the RBT service, receiving RBT sound sources convertible by the multimedia codec from the sound source-providing server, and transmitting the RBT sound sources to the caller-side switching center, so that the transmitted RBT sound sources are reproduced on the originating terminal according to the multimedia codec that is a codec other than a voice codec for voice communication between the originating terminal and the terminating terminal; and
the sound source-providing server for storing the RBT sound sources and transmitting the RBT sound sources selected using the multimedia codec information to the receiver-side switching center when the ISUP call connection request message is received from the receiver-side switching center.

23. The system as claimed in claim 22, further comprising a sound source-providing control server for searching for RBT sound source codes convertible by the multimedia codec by means of the multimedia codec information and transmitting the searched RBT sound source codes to the sound source-providing server, when sound source code request signals including the multimedia codec information are received from the sound source-providing server.

24. The system as claimed in claim 22, further comprising a web server being connected to the sound source-providing server or the sound source-providing control server, for adding sound sources to be stored in the sound source-providing server, or providing the sound source-providing control server with information for specifying sound sources and a wire/wireless web page for changing the RBT sound source codes corresponding to the information for specifying the sound sources.

25. The system as claimed in claim 23, further comprising a web server being connected to the sound source-providing server or the sound source-providing control server, for adding sound sources to be stored in the sound source-providing server, or providing the sound source-providing control server with information for specifying sound sources and a wire/wireless web page for changing the RBT sound source codes corresponding to the information for specifying the sound sources.

* * * * *